3,313,745
PROCESS FOR PRODUCING FOAM BODIES FROM SULFITE WASTE LIQUOR AND A FOAM PRODUCT PRODUCED ACCORDING TO THE PROCESS
Oluf Walther Henry Klug, Villa Ro, Skogsryd, Boras, Sweden
No Drawing. Filed Feb. 21, 1963, Ser. No. 260,321
Claims priority, application Sweden, Feb. 22, 1962, 1,948/62
8 Claims. (Cl. 260—2.5)

The present invention relates to a process for producing foamed bodies from sulfite waste liquor.

Unevaporated sulfite waste liquor contains about 12–15% solid matter. This consists principally of up to 50% of lignosulfonic acids largely bound as calcium lignosulfonate, about 20% fermentable sugars (hexoses), 6–9% non-fermentable sugars (pentoses), about 3% formic and acetic acids, small amounts of other organic acids, e.g., tannic acid, about 3% resin and various constituents not exactly defined.

It is understandable that the recovery of the valuable constituents of the sulfite waste liquor is a problem as old as the pulping industry itself. About 5–7 m.$^3$ of sulfite waste liquor is obtained for every ton of pulp produced and this implies for a sulfite mill that immense quantities of sulfite waste liquor are discharged into the water courses. Even if it has been possible hitherto to utilize some material contained in the sulfite waste liquor, especially the hexoses, which in many mills are fermented to alcohol, the greater part of the sulfite waste liquor has hitherto been discarded.

The economic utilization of sulfite waste liquor has been the object of profound research, but despite an insight into its potential utility as a chemical raw material and despite the many suggestions that have been advanced, great quantities are still wasted. Among methods practiced it can be mentioned, for example, that sulfite waste liquor has been used as fuel, it being first necessary to evaporate the sulfite waste liquor to dryness. In this way water contamination can certainly be prevented, but on the other hand the evaporation requires a large amount of heat, which is why this method is not economical. To a lesser extent, the lignin has been used as a raw material for producing vanillin and tanning materials. As a commercial product, concentrated sulfite waste liquor has been used primarily as a dust binding agent on roads, as a glue and as a binder for briquettes.

In recent years lignocellulosic materials have been utilized for the production of so-called lignin plastics. In this case wood chips, sawdust, corn stalks, straw or cane bagasse can be used as lignocellulosic material. In this process, developed in U.S., the lignocellulose material is subjected to a partial hydrolysis by soaking it in dilute acid or treating it with hot water or steam, in the presence of acid. The softening point of the lignin is lowered with plasticizers such as aniline, but a full separation of the lignin from the cellulosic material is not necessary. The altered material is finely divided by grinding in rod or ball mills or by exploding from a high pressure (e.g., 800 to 1200 lb. per sq. in.) to atmospheric pressure, the structure being broken and the cellulose fibers separated from their lignin bond. The product can be used as such or mixed with other synthetic resins, e.g., of the condensation type such as phenolic resins, plasticizers and fillers, etc. For the most part, however, the woody material present is sufficient as a filler. The mass is then pressed and cured at an elevated temperature. Pressures of up to 2.200 lb. per sq. in. and temperatures of up to 280° C. may be used.

According to this process, a molding composition is prepared from a lignocellulosic material, in which molding composition the capability of the lignin to undergo polycondensation is utilised, temperatures approaching 280° C. being required for the curing.

A method of producing foamed bodies from sulfite waste liquor is also known which consists principally of unevaporated sulfite waste liquor being liberated from the cation by treatment with an acid (e.g., sulfuric acid for precipitation of calcium sulfate) or by treatment with an ion exchange resin in the H-form (e.g., of the polystyrenesulfonic acid type), the cations bound in the lignosulfonic acid molecules (e.g., Ca, Mg, Na) being replaced by hydrogen. The treated waste liquor is evaporated thereafter and recovered in the form of a dry powder which is poured into moulds and heated to a temperature (about 150° C.–200° C.) at which the powder, because of the $SO_2$ released, blows up forming an expanded foamed body insoluble in water.

Thus, in order to produce these foamed bodies, the sulfite waste liquor must first be treated with an acid or an ion exchange resin to remove the cation, thereafter evaporated to dryness in a vacuum and finally heated.

According to the present invention it has now proved possible to produce foamed bodies with several excellent features, without special pre-treatment and without using elevated temperatures, by an economically rewarding process from sulfite waste liquor commercially available, concentrated to about 50% dry solids content. The process is characterised principally by the steps of mixing an aqueous mixture, containing evaporated sulfite waste liquor and a urea-formaldehyde pre-condensate with an acid curing agent, converting the mixture into a foamed condition and thereafter curing the mixture at room temperature (about 20° C.).

According to a preferred embodiment the process of the invention comprises the steps of mixing 50–80% by weight of a mixture of 1–3 parts by weight of sulfite waste liquor (dry solids) in the form of an approximately 50% by weight aqueous solution and 1 part by weight of an urea-formaldehyde pre-condensate (dry solids) in the form of an approximately 50% aqueous solution, with 2–20% by weight of an acid curing agent calculated from the weight of urea-formaldehyde pre-condensate, converting the mixture into a foamed condition, incorporating a filler with the foamed mixture thus obtained in a quantity of up to 5 times the weight of the mixture, and curing the foamed mixture.

The curing takes place at normal room temperature of 20°–25° C. in a short time that can be reckoned in minutes.

Foaming can be effected by mechanical agitation or the injection of air, but the mixture intended for foaming is preferably mixed with a blowing agent, e.g., soda ash, in a quantity of for example 1–8% by weight of the mixture without the filler, according to the desired pore volume and apparent density. The foaming may also be effected by the use of a blowing agent alone.

The urea-formaldehyde pre-condensate is a soluble intermediate product which is cured in the presence of an acid curing agent or catalyst. As such, formic or phosphoric acid for example is added. By suitably choosing the amount of catalyst it is possible to adjust the desired curing time in a simple manner. This, in turn, is substantially dependent on the speed with which the mixture expands and consequently if any blowing agent has been added on the amount added, in order to give a product having the desired porosity. If too large a quantity of curing agent is added, the blowing agent has not time to complete the reaction and the gas bubbles developed have not time to expand to a sufficient extent before the mixture has set, the product becoming too dense. If, on the other hand, too small a quantity of curing agent is added, it is possible that the gas bubbles developed will be too big or that the bubble structure will collapse before the mixture has set. With regard to these aspects, the suitable range for the curing agent added is about 2–20% by weight of urea-formaldehyde pre-condensate. A preferred range for the curing agent added according to the invention is 12–15% by weight of dry urea-formaldehyde pre-condensate and within these limits the addition of the curing agent can be varied in order to give a certain desired pore volume. It should be noted, however, that the amount of, i.a., formic and acetic acids in the sulfite waste liquor must be taken into account, the quantity of curing agent added being diminished to a corresponding degree in a greater weight ratio of sulfite waste liquor to curing agent, and vice versa.

The urea-formaldehyde pre-condensate can, according to the invention, be modified with great advantage with melamine, suitably in quantity of 10–30% by weight of the dry solids of the urea-formaldehyde pre-condensate.

As examples of suitable fillers, wood chips, saw dust, wood flour, vermiculite, diatomaceous earth, powdered stone, pumice stone gravel, peat powder and shredded peat can be mentioned.

In order to improve the water-repellent properties of the finished foamed body, i.e., to reduce its water absorption, a conventional water repellent, e.g., waxes or silicone oils (siloxanes) or insoluble stearates, e.g., aluminum stearate, can be incorporated with the foamed mixture in a quantity of 0.5–1.5% by weight of the foam mixture.

*Example 1*

A foamed body was produced from the following constituents:

|   | Grams |
|---|---|
| Modified urea-formaldehyde resin, 50% aqueous solution | 1500 |
| Sulfite waste liquor, concentrated to 50% by weight | 1500 |
| Blowing agent | 30 |
| Water | 100 |
| Peat, shredded, air-dry | 15 |
| Sawdust | 400 |
| Formic acid, 85% (catalyst) | 145 |

The urea resin used was of a type modified with 20% melamine calculated from the dry solids weight of the urea resin. The sulfite waste liquor used contained about 37% lignin as lignosulfonic acid and about 6% CaO.

The urea-resin solution and the waste sulfite liquor were mixed and the blowing agent added, after which foaming commenced. During the foaming process the filler, i.e., the sawdust and peat, was added. To obtain the desired density and pore volume of the product the moisture content of the filler has to be determined and the amount of water added adjusted thereto. The mixture was poured into molds and allowed to expand at room temperature. Owing to the high density of the sulfite waste liquor the foamed mixture remained sufficiently stable during the curing process, which took place after some minutes, and hence the bubbles formed did not collapse before the curing had set in. After completion of curing the boards were taken out of the molds.

Samples of the boards obtained, when tested, showed the following properties:

Apparent density—0.38 kg./dm.$^3$ (23.7 lb. per cu. ft.)
Thermal conductivity—0.063 kcal./mh. ° C. (0.507 B.t.u./sq. ft., sec., ° F./in.)
Compressive strength—28.3 kgs./cm.$^2$ (402 lb. per sq. in.)
Flexural strength—13.9 kgs./cm.$^2$ (198 lb. per sq. in.)
Water absorption when stored in water—41%
Water absorption when stored in moisture-saturated air—2.2%

The compressive strength was determined from cubes with edges of about 7 cm. in length, the cubes being produced by glueing together two or three sheets taken from the boards.

The thermal conductivity was determined in an apparatus according to D. L. Lang at an average temperature of about +10° C. and with a temperature difference over the sample of about 20° C. In connection with the test, the apparent density of the sample was determined.

In addition, the resistance of the material to incipient fire was determined in the following manner. The boards were erected at a mutual distance of 5 cm. so that one board stood on the floor while the bottom edge of the other board was 125 cm. above the floor. The flame from a gas burner was directed towards the inner side of the board standing on the floor. The mouth of the burner was placed at a distance of 4 cm. from the wall. The free length of the flame was 20 cm. and its temperature at the surface treated about 900° C.

During the experiment the flame was kept alight until the material in the test boards maintained the combustion, at the most, however, for 15 minutes. Observations were made during the course of the experiment concerning the tendency of the boards to be ignited or spread the fire from the gas flame. The test, which continued for 15 minutes showed that the material did not ignite and could not maintain the combustion. According to the criteria applicable for judging fire protection preparations for wood or similar material, the sample examined can be designated as resistant to incipient fire.

*Example 2*

Foamed bodies were produced from the same mixture as in Example 1, but with the difference that, in addition, 30 gm. aluminum stearate were mixed in as water-repellent agent, the method being the same as described in Example 1. As is clear from the test results below, the product displayed considerably less water absorption when stored in water, although this was achieved at the cost of the compressive and flexural strength.

Apparent density—0.35 kg./dm.$^3$ (21.8 lb. per cu. ft.)
Thermal conductivity—0.051 kcal./mh. ° C. (0.41 B.t.u./sq. ft., sec. ° F./cu.)
Compressive strength—12.7 kgs./cm.$^2$ (180 lb. per sq. in.)
Flexural strength—5.6 kgs./cm.$^2$ (80 lb. per sq. in.)
Water absorption when stored in water (7×24 hrs.)—8%
Water absorption when stored in saturated air moisture (17×24 hrs.)—2.1%

The foamed body produced according to the invention displays many prominent features rendering it suitable for use as, i.a., building material, such as wallboard, wallpanels, inner walls, ceilings, etc., heat insulating material and packing material. The material according to the invention has also proved itself to be excellent as sound insulating material, which, for this reason too, makes the product suitable for use as material for inner walls and ceilings in home and halls etc. The resistance to incipient fire of the foamed body is surprising when considering the organic nature of the material. Moreover it is resistant to decay fungi and other microorganisms. By suitably adjusting the amount of hardener and blowing agent added, foamed bodies can be produced with apparent densities of down to 0.05 kgs./dm.$^3$ (3 lb. per cu. ft.) and with a thermal conductivity as low as 0.025 kcal./mh. ° C. (0.20 B.t.u./sq. ft., sec., ° F./in.), i.e., with excellent heat insulating properties. The foamed product can be produced directly in finished form by allowing the mixture to expand in a mold of the desired configuration.

The invention is not limited to the embodiments described in the examples, but can be varied in many ways within the scope of the basic inventive idea.

What I claim is:

1. A process for the production of foamed bodies from sulfite waste liquor which comprises preparing a mixture of about 1–3 parts by weight (dry solids) of an evaporated sulfite waste liquor, and 1 part by weight (dry solids) of a melamine modified urea-formaldehyde pre-condensate, with 2–20% by weight of an acid curing agent; based on the weight of urea-formaldehyde pre-condensate, converting the mixture into a foamed condition; and thereafter curing the foamed mixture at about normal room temperature.

2. A process as claimed in claim 1 in which the amount of melamine used to modify the urea-formaldehyde pre-condensate is 10–30% by weight of the dry solids of the urea-formaldehyde pre-condensate.

3. The process as claimed in claim 1 in which the evaporated sulfite waste liquor is added in the form of a liquor evaporated to about 50% dry solids content, and the curing temperature is about 20° C.

4. The process as claimed in claim 1 in which the mixture is foamed by adding a blowing agent in a quantity of about 1–8% by weight of the mixture without the filler.

5. A process for the production of foamed bodies from sulfite waste liquor which comprises mixing 1–3 parts by weight of sulfite waste liquor (dry solids) in the form of an approximately 50% aqueous solution and 1 part by weight of a urea-formaldehyde pre-condensate (dry solids) in the form of an approximately 50% aqueous solution, with 2–20% by weight of an acid curing agent calculated from the weight of urea-formaldehyde pre-condensate; converting the mixture into a foamed condition; incorporating a filler with the foamed mixture thus obtained in a quantity of up to about 5 times the weight of the mixture; and curing the foamed mixture.

6. The process as claimed in claim 5 in which the mixture is foamed by adding a blowing agent in a quantity of 1–8% by weight of the mixture without the filler.

7. The process as claimed in claim 6 in which the blowing agent is soda ash.

8. A process for the production of foamed bodies from sulfite waste liquor which comprises mixing 1–3 parts by weight of sulfite waste liquor (dry solids) in the form of an approximately 50% aqueous solution and 1 part by weight of a urea-formaldehyde pre-condensate (dry solids) modified with melamine in a quantity of about 10–30% by weight of the dry solids of the urea-formaldehyde pre-condensate, said melamine modified urea-formaldehyde pre-condensate being supplied in the form of an approximately 50% aqueous solution; admixing 2–20% by weight of an acid curing agent calculated from the weight of urea-formaldehyde pre-condensate; converting the mixture into a foamed condition; incorporating a filler with the foamed mixture thus obtained in a quantity of up to about 5 times the weight of the mixture; and curing the foamed mixture at about normal room temperature.

References Cited by the Examiner
UNITED STATES PATENTS

| | | | |
|---|---|---|---|
| 2,337,915 | 12/1943 | Menger et al. | 260—2.5 |
| 2,926,722 | 3/1960 | Lauring | 260—2.5 |
| 2,947,647 | 8/1960 | Hart et al. | 260—2.5 |
| 2,970,120 | 6/1961 | Kreidl | 260—2.5 |

MURRAY TILLMAN, *Primary Examiner.*

N. F. OBLON, M. FOELAK, *Assistant Examiners.*